(12) United States Patent
Tien et al.

(10) Patent No.: US 7,593,080 B2
(45) Date of Patent: Sep. 22, 2009

(54) LIQUID CRYSTAL DISPLAY PANEL

(75) Inventors: Ming-Feng Tien, Hsinchu (TW);
Wan-Hua Lu, Hsinchu (TW); Jenn-Jia Su, Hsinchu (TW); Ting-Jui Chang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 286 days.

(21) Appl. No.: 11/779,906

(22) Filed: Jul. 19, 2007

(65) Prior Publication Data

US 2008/0111961 A1    May 15, 2008

(30) Foreign Application Priority Data

Nov. 9, 2006    (TW) ............................. 95141482 A

(51) Int. Cl.
*G02F 1/1337*    (2006.01)

(52) U.S. Cl. .................................................. 349/129

(58) Field of Classification Search ............... None
See application file for complete search history.

(56) References Cited

U.S. PATENT DOCUMENTS

| | | | |
|---|---|---|---|
| 5,619,357 A * | 4/1997 | Angelopoulos et al. | 349/110 |
| 6,424,388 B1 * | 7/2002 | Colgan et al. | 349/27 |
| 6,433,852 B1 * | 8/2002 | Sonoda et al. | 349/156 |
| 7,145,619 B2 * | 12/2006 | Sawasaki et al. | 349/129 |
| 7,372,533 B2 * | 5/2008 | Inoue et al. | 349/123 |
| 2003/0147027 A1 * | 8/2003 | Wachi | 349/106 |

* cited by examiner

*Primary Examiner*—Sung H Pak
(74) *Attorney, Agent, or Firm*—Thomas, Kayden, Horstemeyer & Risley

(57) ABSTRACT

The disclosed is a liquid crystal display panel having alignment protrusions with an appropriate optical density (OD) of about 0.3/μm to 3/μm, and preferably of about 0.8/μm to 1.3/μm. The invention solves problems such as light leakage in dark conditions caused by transparent alignment protrusions and mismatch caused by black alignment protrusions overlapping the alignment marks.

15 Claims, 3 Drawing Sheets

LIQUID CRYSTAL DISPLAY PANEL

This application claims the benefit of Taiwan Patent Application Serial No. 95141482, filed Nov. 9, 2006, the subject matter of which is incorporated herein by reference.

BACKGROUND OF THE INVENTION

1. Field of the Invention

The invention relates to liquid crystal display panels, and in particular to alignment protrusion design thereof.

2. Description of the Related Art

Multi-domain vertical alignment (MVA) is popular for use in wide-viewing angle liquid crystal display panels, in which alignment protrusions are formed on a substrate, such that the liquid crystal molecules are perpendicular to the alignment protrusions. The liquid crystal molecules can function as dual-domain, quad-domain, or multi-domain by designing the alignment protrusion pattern. Because the liquid crystal molecules do not align in a single direction, normal images are viewable from different angles. Even in large liquid panels, the viewing angle can be modified to almost 180°.

Conventional alignment protrusions comprise general photoresist such as positive type or negative photoresist. Because the alignment protrusions are formed of transparent photoresist materials, light leakage occurs in dark conditions. As shown in FIG. 1, a conventional liquid crystal panel 1 comprises color filter substrate 11, array substrate 13, and liquid crystal layer 17 disposed therebetween. The color filter substrate 11 is a multi-layered structure including transparent conductive layer 11a, color filters 11b, and transparent substrate 11c underlying the transparent alignment protrusion 10. The array substrate 13 is a multi-layered structure including transparent conductive layer 13a, passivation layer 13b, dielectric layer 13c, and transparent substrate 13d, wherein the transparent conductive layer 13a has slits 15 corresponding to the alignment protrusion 10. The liquid crystal molecules 17a near the alignment protrusion 10, unlike the liquid crystal molecules 17b in other regions, are not perpendicular to the substrate in dark conditions. When incident light passes through the liquid crystal layer 17, the phase difference causes light leakage as shown in light leakage curve 19, where a longitudinal axis shows light leakage strength, and the transverse axis corresponds to the position of the protrusion 10 of the color filter substrate 11.

BRIEF SUMMARY OF THE INVENTION

The invention provides a liquid crystal display panel, comprising a substrate having at least one alignment protrusion, wherein the alignment protrusion has an optical density of about 0.3/μm to about 3/μm, an opposing substrate disposed opposite to the substrate, and a liquid crystal layer disposed between the substrate and the opposing substrate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
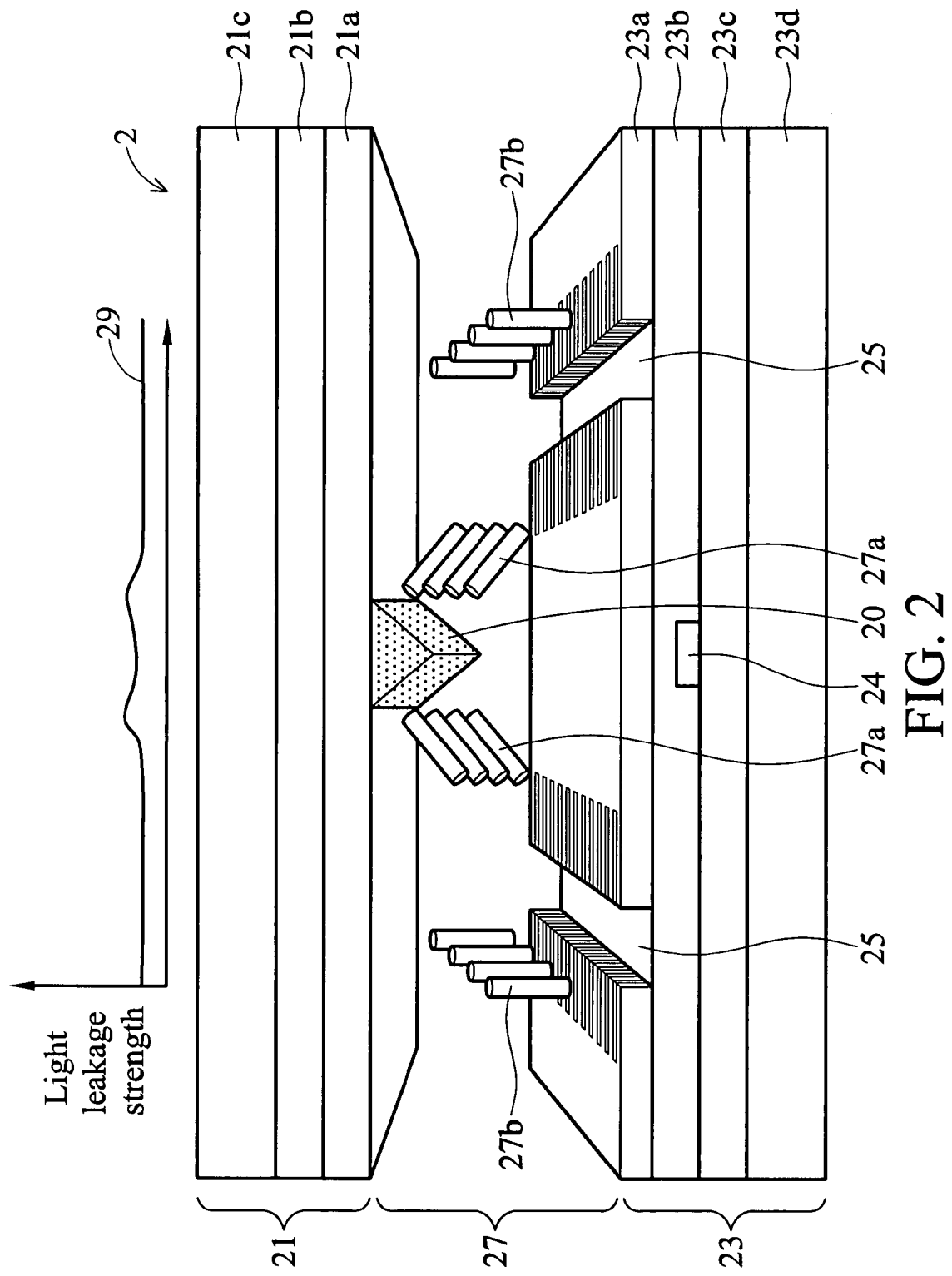
FIG. 2 is a cross-sectional view of a liquid crystal panel with suitable optical density alignment protrusions and corresponding light leakage curve in an embodiment of the invention.

As shown in FIG. 2, a liquid crystal display panel 2 of an embodiment of the invention has a color filter substrate 21, an array substrate 23, and a liquid crystal layer 27 disposed therebetween. The color filter substrate 21 is a multi-layered structure including a transparent conductive layer 21a, color filters 21b, and a transparent substrate 21c sequentially formed underlying an alignment protrusion 20. The array substrate 23 is also a multi-layered structure including a transparent conductive layer 23a having slits 25 corresponding to the alignment protrusion 20, wherein alignment protrusion 20 is disposed substantially between the two slits 25, a passivation layer 23b, a dielectric layer 23c, and a transparent substrate 23d. In dark conditions, the tilt angles of the liquid crystal molecules 27a near the alignment protrusion 20 are different from that of the liquid crystal molecules 27b in other regions. The liquid crystal molecules 27b are perpendicular to the substrate, but the liquid crystal molecules 27a are not. The transparent conductive layers 21a and 23a are made of the same or different materials, such as indium tin oxide (ITO), aluminum zinc oxide (AZO), indium zinc oxide (IZO), gallium zinc oxide (GZO) or combinations thereof. Generally, the passivation layer 23b is silicon oxide ($SiO_x$), silicon nitride ($SiN_x$), silicon oxynitride ($SiO_xN_y$) or combinations thereof. The dielectric layer 23c is and the alignment marks is not necessary, thereby saving the cost.

Alignment protrusion 20 may be comprised of organic material, inorganic material, or combinations thereof. The OD of the alignment protrusion 20 is tuned by metal oxide, carbon black, dye, pigment, or combinations thereof. The higher concentration of the dye or the like in alignment protrusion 20 raises OD. Accordingly, the additive amount is optionally selected from desired OD. The alignment protrusion 20 can be red, blue, green, purple, cyan, magenta, gray, brown, or yellow by selecting different dye or pigment. In an embodiment, at least part of the alignment protrusion 20 overlaps the common electrode 24 of the array substrate 23, thereby improving the aperture ratio.

Although the cross section of the alignment protrusion 20 is triangular, other shapes may adopt to be cross section such as circle, ellipse, ladder-shape, square, or rectangle. For simplicity and reducing photo mask, the cross section of alignment protrusions in same substrate is preferably the same.

Figure 3:
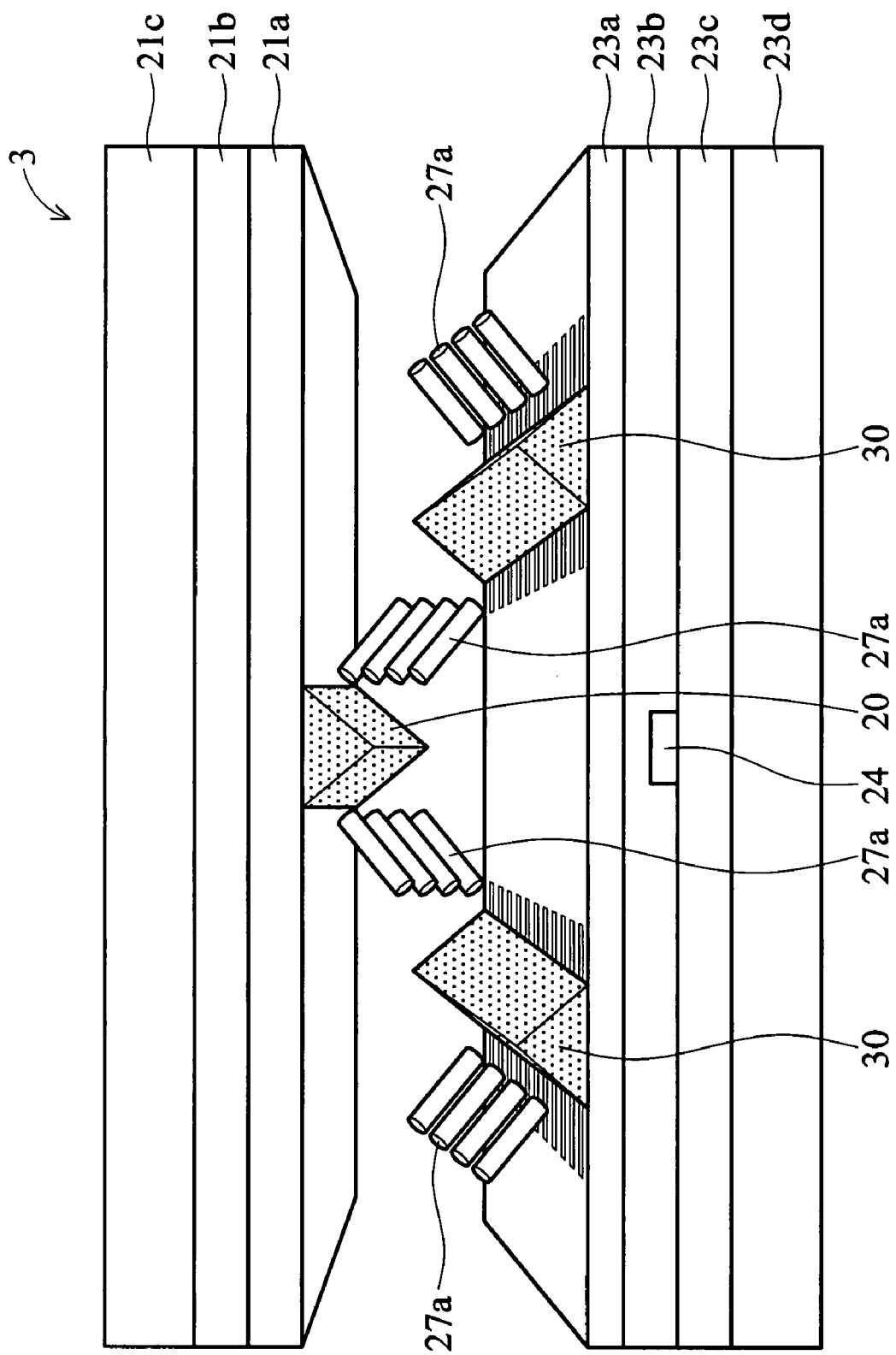
FIG. 3 is a cross-sectional view of a liquid crystal panel comprising other alignment protrusions corresponding to the alignment protrusions in a further embodiment of the invention.

While alignment protrusion 20 is formed on the color filter substrate 21 opposite the array substrate 23 in FIG. 2, the alignment protrusion 20 is not limited thereto. For example, the alignment protrusion 20 may be formed on the array substrate 23, and the corresponding slits formed on the color filter substrate 21. In another embodiment of the invention, as shown in FIG. 3, the slits are substituted by other alignment protrusions 30. The OD of the alignment protrusions 30 is preferably similar to the OD of the alignment protrusion 20. The OD of the alignment protrusions 30 may be different from that of the alignment protrusion 20. In further embodiments of the invention, color filter on array (COA) substrate or array substrate on color filter (AOC) substrate can be adopted in liquid crystal display panel, and the alignment protrusions may be formed on the AOC substrate, the AOC substrate, or the opposing substrate. Irrespective of substrate type, the alignment protrusion with specific range OD of the invention may effectively solve problems cased by preferably silicon oxide ($SiO_x$), silicon nitride ($SiN_x$), silicon oxynitride ($SiO_xN_y$) or combinations thereof. The transparent substrates 21c and 23d can be the same or different material, such as glass, plastic, quartz, or other flexible materials.

One of the differences between the conventional liquid crystal display panel 1 and the liquid crystal display panel 2 of the invention is optical density (OD) of the alignment protrusions. The alignment protrusion 20 of the present embodiment has an OD of about 0.3/μm to about 3/μm, preferably of about 0.5/μm to about 2/μm, and more preferably of about 0.8/μm to about 1.3/μm. The OD is defined as log(1/T), and T is transparency (0-100%) If alignment protrusion is transparent material such as T is 100%, the OD thereof is 0. If alignment protrusion is a black material with transparency of about 0, the OD thereof is about infinity. Because the thicker alignment protrusion has higher OD, μm is selected as unit for clarity. Because the alignment protrusion 20 has OD of described range, thereby reducing the light leakage in dark conditions caused from transparent alignment protrusion.

Figure 1:
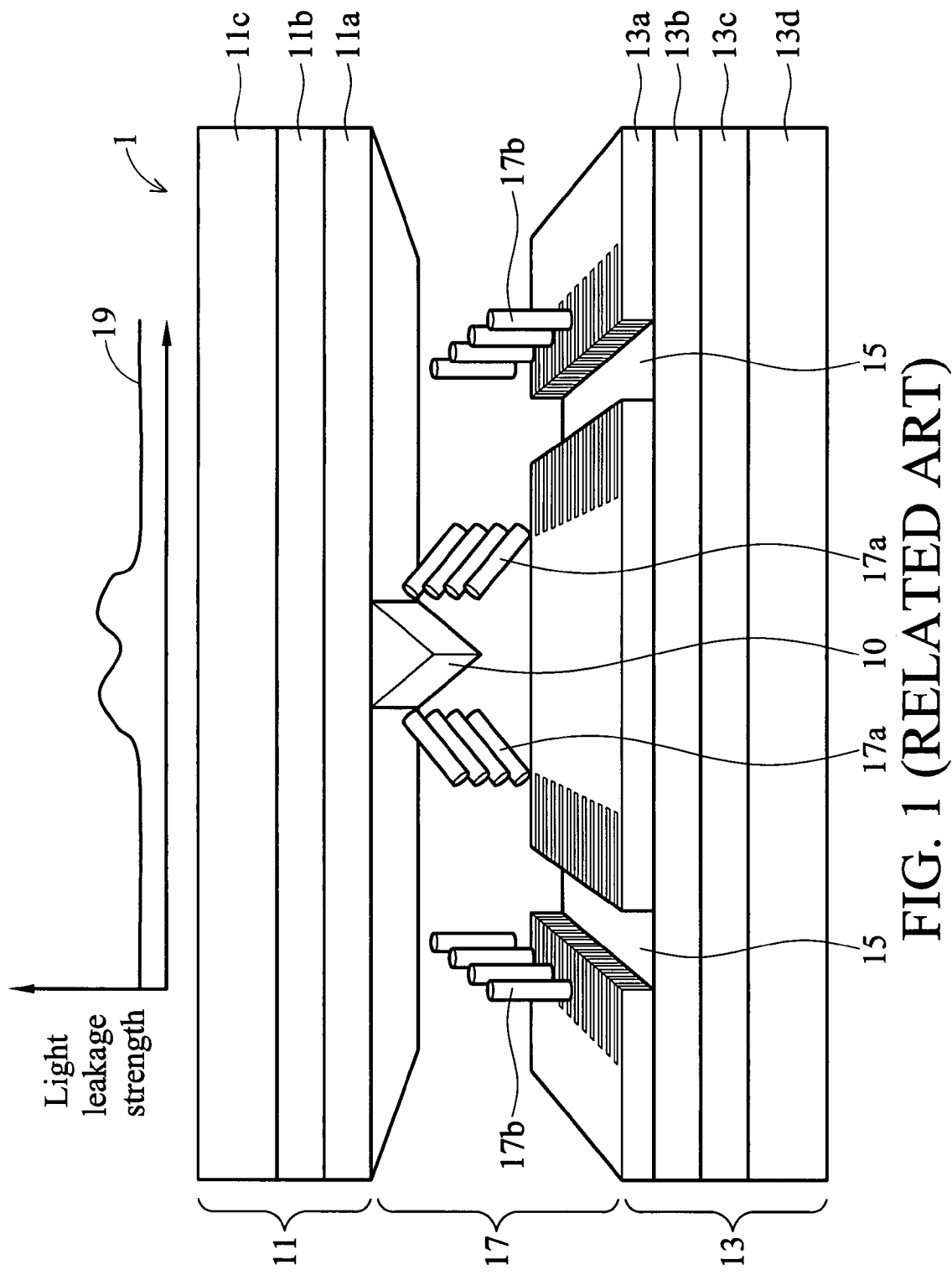
FIG. 1 is a cross-sectional view of a conventional liquid crystal panel with transparent alignment protrusions and corresponding light leakage curve.

The light leakage curve 29 in FIG. 2 has been apparently improved than the light leakage curve 19 in FIG. 1. When the OD of the alignment protrusion 20 is higher, the light leakage curve 29 is smoother, becoming horizontal in extreme conditions. However, the maximum of the alignment protrusion 20 OD is 3, since excess OD of the alignment protrusion 20 will cause the alignment marks (not shown) of the color filter substrate 21 misaligning that of the array substrate 23. If the alignment marks of the color filter substrate 21 are shielded by the alignment protrusion 20, the alignment marks cannot be detected in exposure processes. Even when no alignment protrusions 20 overlap the alignment marks, the black alignment protrusions reduce the aperture ratio. The alignment protrusion 20 with appropriate OD of the invention may avoid problems from black alignment protrusions. Additionally, new design layout of the alignment protrusions transparent or black alignment protrusions. Alternatively, the material, shape, size, or OD of the alignment protrusions 30 and alignment protrusion 20 can be same or different. In still another embodiment, referring to FIG. 3, while alignment protrusions 30 are formed, the alignment protrusions 20 may be eliminated. The alignment protrusion 30 of the present embodiment has an OD of about 0.3/μm to about 3/μm, preferably of about 0.5/μm to about 2/μm, and more preferably of about 0.8/μm to about 1.3/μm. Alignment protrusion 30 may be comprised of organic material, inorganic material, or combinations thereof. The OD of the alignment protrusion 30 is tuned by metal oxide, carbon black, dye, pigment, or combinations thereof. The alignment protrusion 30 can be red, blue, green, purple, cyan, magenta, gray, brown, or yellow by selecting different dye or pigment. Although the cross section of the alignment protrusion 30 is triangular, other shapes may adopt to be cross section such as circle, ellipse, ladder-shape, square, or rectangle.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display panel, comprising:
    a first substrate including at least one alignment protrusion, wherein the alignment protrusion has an optical density of about 0.3/μm to about 3/μm;
    an second substrate disposed opposite to the substrate; and
    a liquid crystal layer disposed between the first substrate and the second substrate.

2. The liquid crystal display panel as claimed in claim 1, wherein the first substrate is a color filter substrate and the second substrate is an array substrate.

3. The liquid crystal display panel as claimed in claim 1, wherein the first substrate is an array substrate and the second substrate is a color filter substrate.

4. The liquid crystal display panel as claimed in claim 1, wherein the substrate comprises a color-filter-on-array (COA) substrate or an array-on-color-filter (AOC) substrate.

5. The liquid crystal display panel as claimed in claim 1, wherein the alignment protrusion has an optical density of about 0.5/μm to about 2/μm.

6. The liquid crystal display panel as claimed in claim 1, wherein the first substrate further includes a common line overlapping at least part of the alignment protrusion.

7. The liquid crystal display panel as claimed in claim 1, wherein the second substrate includes a common line overlapping at least part of the alignment protrusion.

8. The liquid crystal display panel as claimed in claim 1, wherein the alignment protrusion has an optical density of about 0.8/μm to about 1.3/μm.

9. The liquid crystal display panel as claimed in claim 1, wherein the alignment protrusion has colors comprising red, green, blue, purple, cyan, magenta, gray, brown, or yellow.

10. The liquid crystal display panel as claimed in claim 1, wherein the alignment protrusion has cross sections comprising circle, ellipse, triangle, ladder-shape, square, or rectangle.

11. The liquid crystal display panel as claimed in claim 1, wherein the second substrate has at least one slit corresponding to the alignment protrusion.

12. The liquid crystal display panel as claimed in claim 1, wherein the second substrate includes at least one other alignment protrusion corresponding to the alignment protrusion.

13. The liquid crystal display panel as claimed in claim 12, wherein the other alignment protrusion and the alignment protrusion have substantially the same optical density.

14. The liquid crystal display panel as claimed in claim 1, wherein the alignment protrusion is comprised of inorganic material, organic material, or combinations thereof.

15. The liquid crystal display panel as claimed in claim 1, wherein the alignment protrusion is comprised of metal oxide, carbon black, dye, pigment, or combinations thereof.

* * * * *